US012687292B2

(12) United States Patent
Mathews

(10) Patent No.: US 12,687,292 B2
(45) **Date of Patent: *Jul. 21, 2026**

(54) COMBINATION SPEAKER AND LIGHTING FIXTURE OR OTHER ELECTRICAL ELEMENT

(71) Applicant: Ben Mathews, San Antonio, TX (US)

(72) Inventor: Ben Mathews, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/187,614

(22) Filed: Apr. 23, 2025

(65) Prior Publication Data

US 2025/0251123 A1 Aug. 7, 2025

Related U.S. Application Data

(63) Continuation of application No. 18/234,285, filed on Aug. 15, 2023, now Pat. No. 12,305,847.

(60) Provisional application No. 63/457,682, filed on Apr. 6, 2023.

(51) Int. Cl.
*F21V 33/00* (2006.01)
*F21V 21/04* (2006.01)
*F21V 23/00* (2015.01)
*H04R 1/02* (2006.01)

(52) U.S. Cl.
CPC ........ *F21V 33/0056* (2013.01); *F21V 21/047* (2013.01); *F21V 21/049* (2013.01); *F21V 23/002* (2013.01); *H04R 1/025* (2013.01); *H04R 1/028* (2013.01)

(58) Field of Classification Search
CPC ........ H04R 2201/021; H04R 2201/028; F21V 23/002
See application file for complete search history.

(56) References Cited

U.S. PATENT DOCUMENTS 5,828,765 A 10/1998 Gabe
6,561,670 B1 5/2003 Jongewaard
8,666,104 B2 3/2014 Ivey
10,190,761 B1 1/2019 Winters
10,808,922 B1 10/2020 Hsu
2007/0222631 A1 9/2007 Haase
2007/0223723 A1 9/2007 Haase
2009/0207607 A1* 8/2009 Haase ................. F21V 33/0056 362/86
2011/0080733 A1* 4/2011 Wang ..................... H04R 1/028 362/253
2014/0177901 A1* 6/2014 Berkman ............... H04R 1/021 381/391
2014/0254857 A1 9/2014 Berkman
2014/0360805 A1 12/2014 Berkman
2016/0035201 A1 2/2016 Savage
(Continued)

*Primary Examiner* — Zheng Song
(74) *Attorney, Agent, or Firm* — Jackson Walker L.L.P.

(57) ABSTRACT

A combination speaker and electrical junction box is disclosed for installation in a wall or ceiling. The combined unit includes a means for mechanically attaching a lighting apparatus or another electrical device such as a fan or security camera. The power to the speaker and light fixture or other electrical device may be line- or low-voltage or a combination of both. The data signal going to the speaker, light or other electrical device could be wired or wireless or some combination of both or one or the other. The electrical junction box with speakers combines the functionality of a standard junction box with the added benefit of audio playback capabilities.

20 Claims, 11 Drawing Sheets

(56) References Cited

U.S. PATENT DOCUMENTS

| | | | | |
|---|---|---|---|---|
| 2016/0377245 | A1 | 12/2016 | Yaphe | |
| 2019/0104585 | A1 | 4/2019 | Albrechtsen | |
| 2020/0217484 | A1 | 7/2020 | Millson | |
| 2020/0284420 | A1 * | 9/2020 | Cordero | H05K 7/20409 |
| 2020/0340651 | A1 | 10/2020 | Huang | |
| 2021/0325010 | A1 | 10/2021 | Talbi | |
| 2022/0214037 | A1 | 7/2022 | Huang | |
| 2023/0204200 | A1 | 6/2023 | Kohen | |

* cited by examiner

COMBINATION SPEAKER AND LIGHTING FIXTURE OR OTHER ELECTRICAL ELEMENT

PRIORITY STATEMENT UNDER 35 U.S.C. § 119 & 37 C.F.R. § 1.78

This application is a continuation of U.S. patent application Ser. No. 18/234,285, filed on Aug. 15, 2023, which is a non-provisional of U.S. Provisional Patent Application Ser. No. 63/457,682 filed Apr. 6, 2023. The disclosures of all of these applications are incorporated by reference herein in their entireties.

TECHNICAL FIELD

The embodiments disclosed herein relate in general to the combination of light and sound systems and, more specifically, to a combination of an electrical junction box with integral speakers which can then be configured with a surface, pendant, stem, or wall-mounted lighting fixture, fan, or another electrical device.

BACKGROUND OF THE INVENTION

In the pursuit of clean and minimalist designs in contemporary architectural spaces, designers and architects continually aim to limit the number of fixtures installed on surfaces or ceilings. Not only does this minimize visual clutter, but it also streamlines installation procedures and reduces costs.

However, current integrated solutions, such as the one described in U.S. Pat. No. 7,535,341 (the '341 Patent), present limitations due to their dual-recessed design. These assemblies combine a recessed speaker with a recessed lighting fixture, resulting in a larger installation footprint that extends beyond the height of a standard junction box. This significantly restricts the product's applicability as it may not fit in various spaces, limiting its universal appeal and usage. Moreover, lighting and speakers are typically installed at different times. The '341 Patent claims a recessed downlight speaker whereby the recessed housing of a downlight and baffle assembly house both a downlight and a speaker. While this is an innovative method by which to achieve a combo speaker and recessed light, it's applicability is limited to applications where recessed lights are either present or space is available. Further, is restricts the end user's freedom to pair a light independently of the speaker.

There is a need, therefore for a junction box that complies with industry standards, is easy to install and provides the ability to contemporaneously install a speaker without the need to simultaneously install a light or other electrical device and provide freedom of choice in selecting what light or other electrical apparatus attaches to the speaker combo junction box.

SUMMARY OF THE INVENTION

This invention relates to the combination of one or more speakers with an electrical junction box. More specifically, this invention relates to the combination of a speaker and a junction box which also includes a mechanical means for attachment of a lighting apparatus, or another electrical device, such as a fan or security camera. The power to the speaker and light fixture or other electrical device could be line- or low-voltage or a combination of both. The data signal going to the speaker, light or other electrical device could be wired or wireless or some combination of both.

This unique assembly enhances the aesthetics and functionality of audio and lighting devices in various settings, including residential, commercial, and hospitality spaces. Moreover, this combination of a junction box and recessed speaker offers a versatile, modular, and aesthetically pleasing solution adaptable to a wide range of spatial and design requirements. For instance, it allows the user to have both light and sound over a kitchen island or dining room table, where traditionally a decorative pendant or stem lighting fixture would be found. This invention enhances the user experience by delivering an optimal blend of light and sound exactly where it is desired without sacrificing design intent.

Overall, an electrical junction box conjoined with speakers combines the functionality of a standard junction box with the added benefit of audio playback capabilities. It provides a convenient and organized solution for electrical connections while delivering sound output in a specific area, making it ideal for applications like public address systems, background music distribution, or general audio reinforcement.

The foregoing has outlined rather broadly certain aspects of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

The novel features believed characteristic of the disclosed subject matter will be set forth in any claims that are filed in connection with this application or any of its counterparts. Although the following figures depict various examples of the invention, the invention is not limited to the examples depicted in the figures. The disclosed subject matter itself, as well as a preferred mode of use, further objectives, and advantages thereof, will best be understood by reference to the following detailed description of an illustrative embodiment when read in conjunction with the accompanying drawings, wherein:

DETAILED DESCRIPTION

Figure 1:
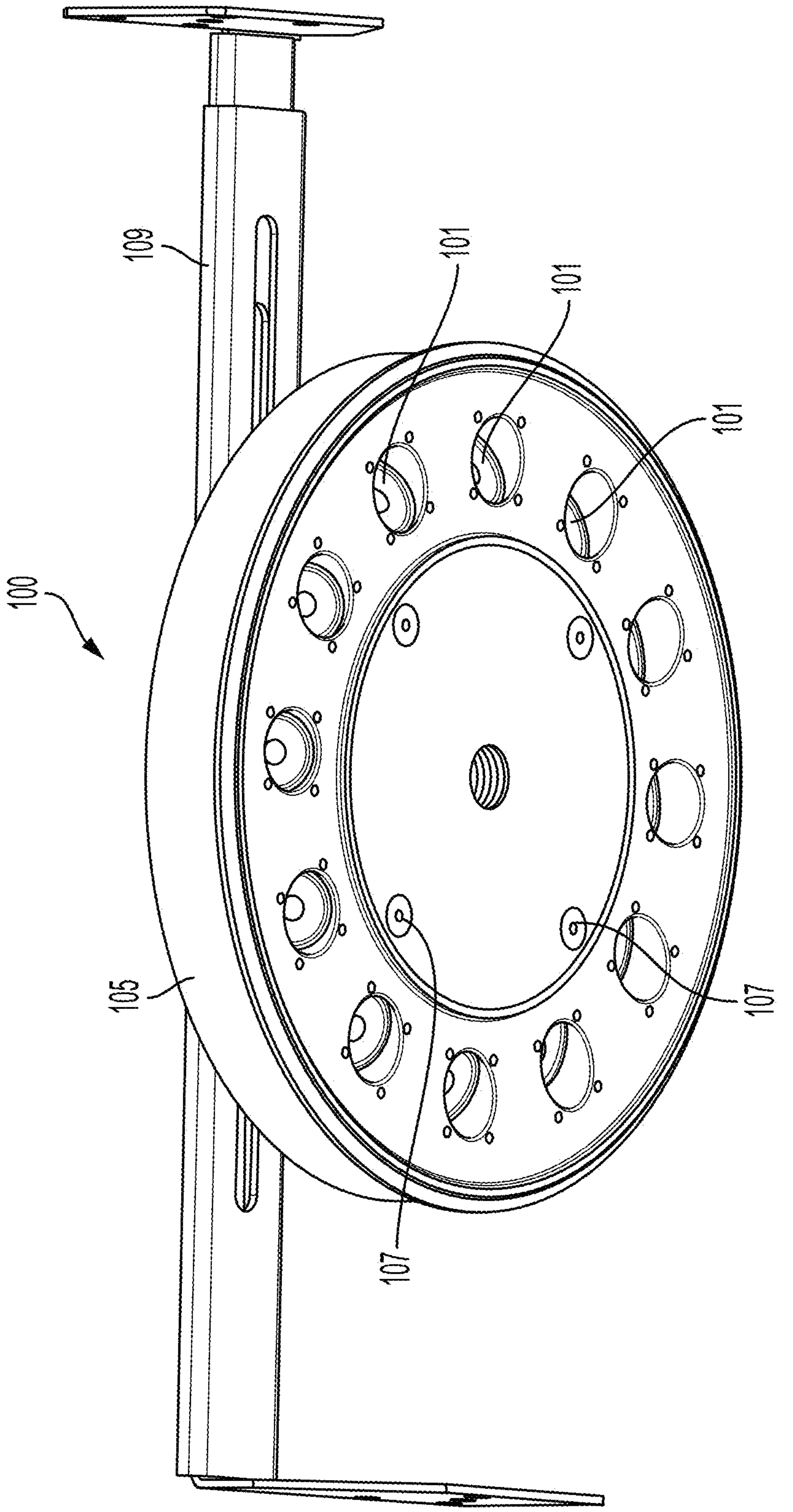
FIG. 1 shows a front-perspective view of a combination junction box and speaker, in accordance with one embodiment of the present invention.

The present invention is directed to improved methods and systems for, among other things, the combination of a speaker and an electrical junction box wherein a light fixture or other electrical device may be installed separately. The configuration and use of the presently preferred embodiments are discussed in detail below. It should be appreciated, however, that the present invention provides many applicable inventive concepts that can be embodied in a wide variety of contexts other than enclosures for recessed lighting. Accordingly, the specific embodiments discussed are merely illustrative of specific ways to make and use the invention, and do not limit the scope of the invention.

The invention presented here proposes an innovative solution to the limitations described above. In various embodiments of the invention, a sound emitting device or devices, which shall be referred to herein as a speaker, are integrated into an electrical junction box. In some embodiments, the speaker may comprise a sound emitting device and an amplifier. In other embodiments, the speaker may comprise a sound emitting device and a lamp. An electrical junction box with speakers is a versatile device that combines the functionality of a junction box, used for housing electrical connections, with the addition of built-in speakers for audio output. It serves as a central point for electrical connections while providing the convenience of audio playback in a specific location or area.

An electrical junction box is a container or enclosure used to protect electrical connections and wiring. It serves as a centralized point where electrical wires or cables from different sources can be connected, spliced, and distributed to various electrical devices or fixtures. Junction boxes are commonly used in residential, commercial, and industrial settings to ensure electrical safety and facilitate proper wiring installations.

The primary purpose of an electrical junction box is to house electrical connections and protect them from environmental factors such as moisture, dust, and accidental contact. By containing the connections within a box, it helps prevent electrical shocks, short circuits, and potential fire hazards.

Junction boxes are typically constructed using durable and fire-resistant materials like metal or high-quality plastic to ensure safety and longevity, with the choice depending on the specific application and environmental conditions. They come in various shapes and sizes, ranging from small rectangular boxes to larger enclosures that can accommodate multiple connections. Inside the junction box, the electrical wires are connected using wire nuts or terminal blocks. These connections can include splicing wires together, connecting wires to switches, outlets, or other devices, and branching off wires to different areas or circuits.

The junction box of the present invention incorporates one or more speakers of various sizes, typically ranging from small to medium, and they may utilize different technologies such as dynamic drivers or flat panel speakers. The number and placement of speakers may vary based on the desired sound distribution in the area.

The junction box may include audio input connectors or terminals to connect external devices like audio sources, amplifiers, or sound systems. These inputs allow for easy integration of the speakers into existing audio setups. The speakers may also be connected to such audio sources, amplifiers, or sound systems by Bluetooth or other wireless technologies. Some units may include built-in volume control knobs or switches, allowing users to adjust the sound output level directly on the junction box and other units may allow the sound to be controlled remotely. To prevent damage to the speakers, the junction box might incorporate built-in protection mechanisms such as overload protection or thermal cut-off circuits.

The conjoined junction box and canopy housing the speakers is designed for surface mounting on walls or ceilings, making it suitable for both indoor and outdoor installations. The box typically includes mounting brackets, screw holes or other mounting elements to securely attach it to the desired surface. In outdoor applications, the junction box may have weatherproofing features such as gaskets or seals to protect the internal components from moisture, dust, or other environmental elements.

In one embodiment, the lighting system of the present invention comprises an electrical junction box having a top surface, side walls and mounting elements positioned opposite the top surface, a canopy in the shape of an upper half of a torus, the canopy having a speaker positioned on the underside of the canopy, wherein the electrical junction box is positioned within the inner circle of the torus and the mounting elements are accessible for mounting an electrical device; and the electrical junction box and canopy being attachable to a wall or a ceiling using the top surface of the electrical junction box.

In various other embodiments, the at least one speaker insider the canopy incorporate a vibration-damping element, ensuring stable operation when an electrical device, such as a ceiling fan, is mounted using the mounting elements. The speaker may function either as standard speaker or subwoofer, offering versatile audio experiences. The speaker and the attached electrical device may operate on low voltage power, line voltage power, or a combination of both, thereby enhancing energy versatility. The canopy may be configured with a microphone that facilitates the reception of voice commands from a third-party provider, thereby enhancing user interactivity. The diameter of the canopy may align with the diameter of a standard junction box, enabling universal compatibility with any standard electrical device through a universal mounting system. The canopy may also utilize Bluetooth or other wireless communication protocols for seamless data transmission and remote operability. The speaker and the attached electrical device may be independently controlled and operated. The speaker and the attached electrical device can operate in synergy, providing an immersive audio-visual experience over a kitchen island, dining room table, or other focal points in a room.

Referring now to FIG. 1, which depicts a canopy 105 housing an array of speakers 101 conjoined with a junction box (not shown) attached to a hanger bar 109. In the center of the array of speakers 101 are the mounting elements 107 to which lights, security cameras or other electrical devices may be attached. The mounting elements 107 have a standard mounting configuration to allow attachment by any device configured to be attached to an industry standard junction box.

Figure 2:
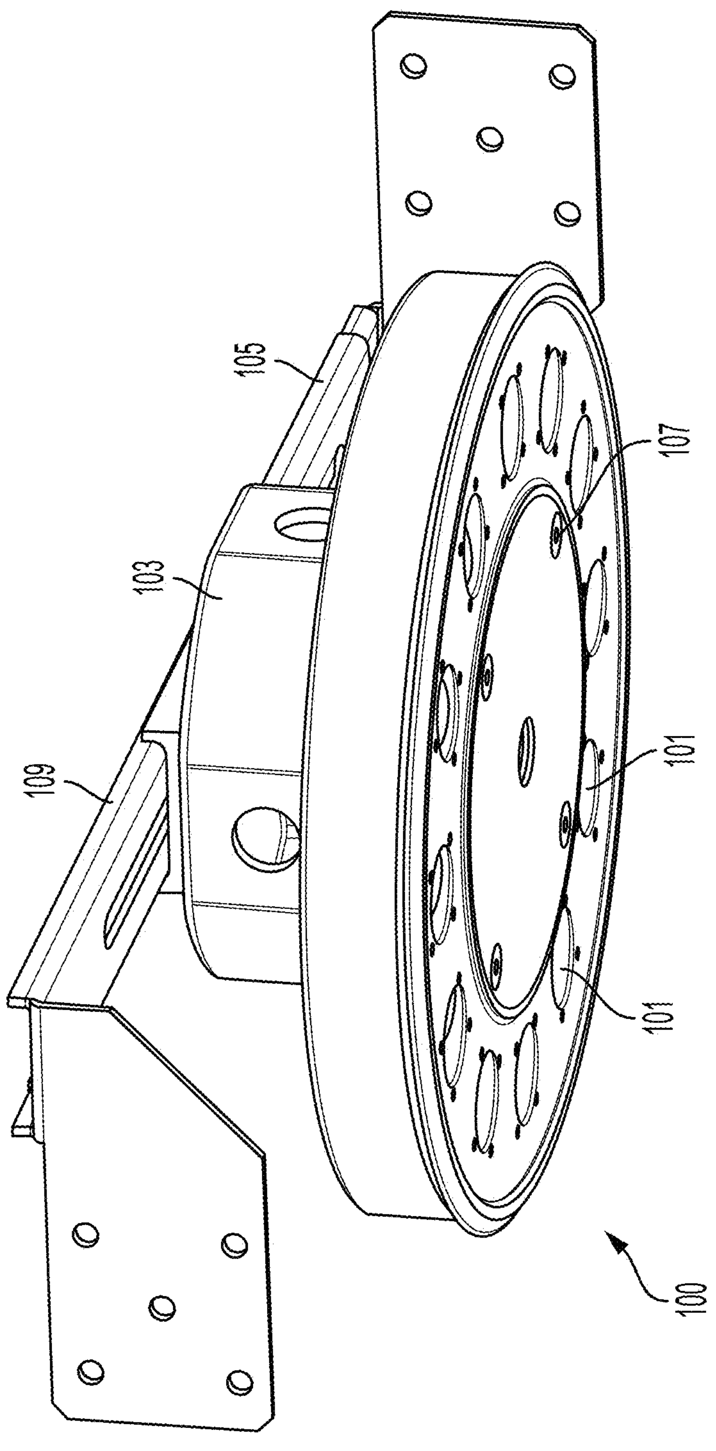
FIG. 2 shows a side-perspective view of a combination junction box and speaker of one embodiment of the system of the present invention.

FIG. 2 shows the same embodiment of the present invention as shown in FIG. 1, but rotated slightly to clearly show junction box 103 that is conjoined with canopy 105 containing the speakers 101. In some embodiments, hanger bar 109 may be secured to junction box 103 such as by a flange or clip which are integrated into junction box 103. Hanger bars 109 may be positioned opposite one another at opposite ends of junction box 103 and secured to junction box 103 using flanges or clips. In addition, various embodiments of junction box 103 may be configured to enable hanger bars 109 to be installed widthwise or lengthwise.

Figure 3:
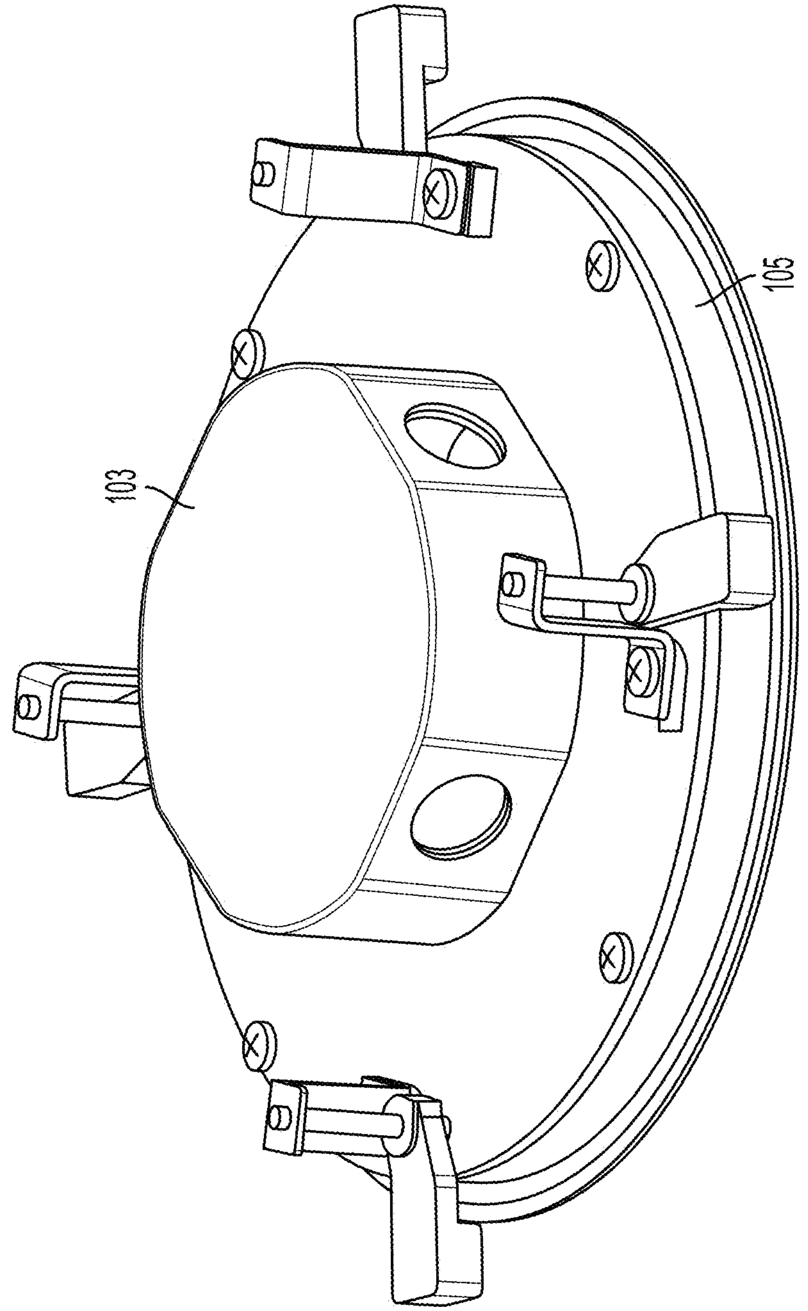
FIG. 3 shows a top-perspective view of a combination junction box and speaker of one embodiment of the system of the present invention.

FIG. 3 also shows the same embodiment as FIG. 1 but rotated further to show the top of the assembly. In this instance, the junction box 103 is conjoined to the canopy 105 using a series of screws, however the junction box 103 and the canopy 105 could all be manufactured as a single unit or, if they are manufactured as separate components, they could be conjoined with any means or method known in the art. A gasket (not shown) may be positioned between junction box 103 and the canopy 105 in order to form a seal therebetween. In some embodiments, the gasket may be overmolded onto junction box 103 or canopy 105.

Figure 4:
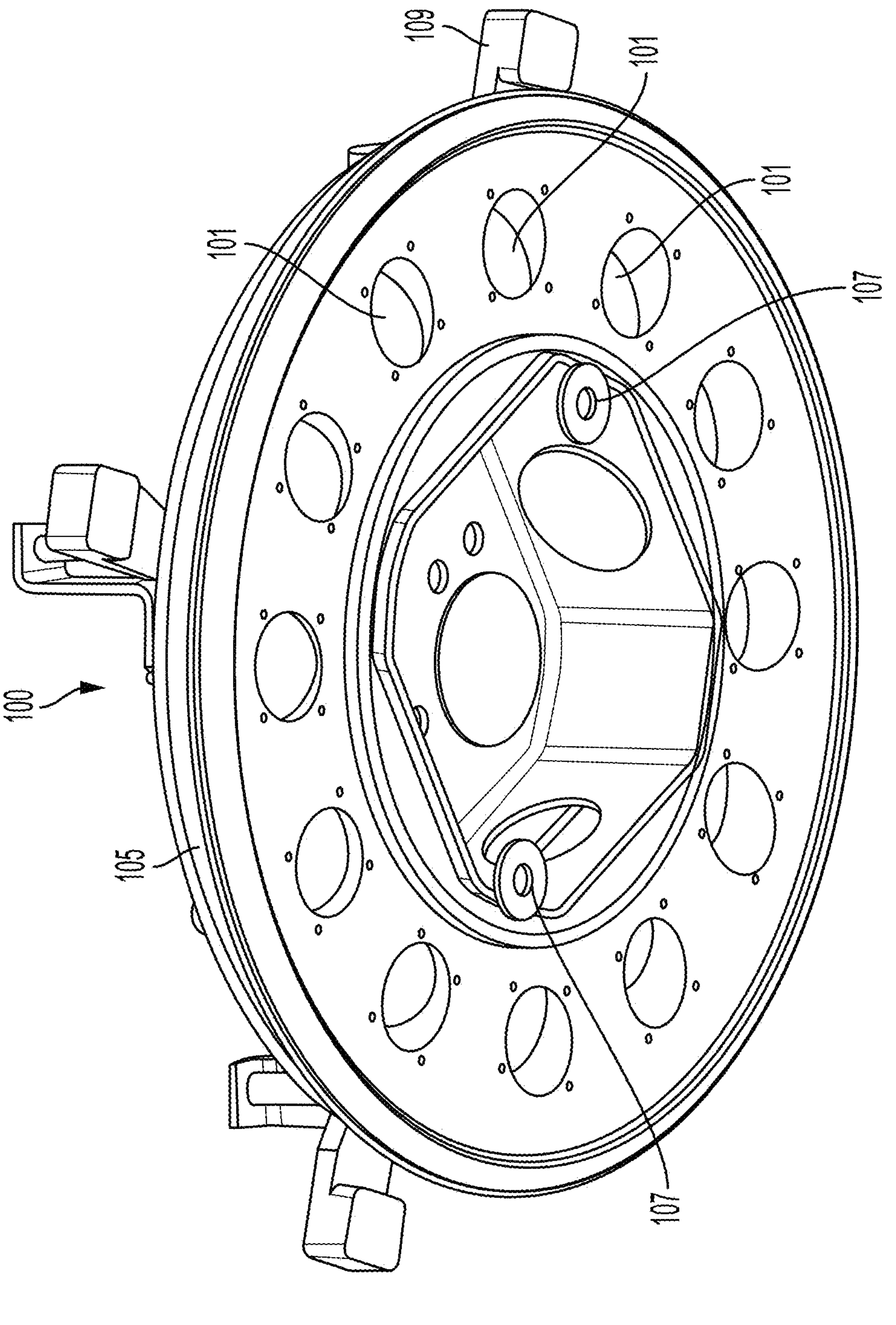
FIG. 4 shows a front-perspective view of a combination junction box and speaker, in accordance with another embodiment of the present invention.

Referring now to FIG. 4, which depicts a canopy 105 housing attached to a hanger bar 109, the housing having an array of speakers 101 fitted with a standard electrical junction box 107. The junction box 107 is positioned in the center of the array of speakers 101 thereby allowing lights, security cameras or other electrical devices having standard connection configurations to be attached. Electrical fixtures are typically attached to a junction box using screws or other mounting hardware. In various embodiments, the junction box of the present invention will match the size and shape of an industry standard fixture's mounting bracket. Many electrical fixtures come with a mounting bracket that attaches to the junction box. The bracket serves as a secure base for the fixture to be mounted on. In some cases, the fixture itself may have an integrated mounting plate instead of a separate bracket.

Figure 5:
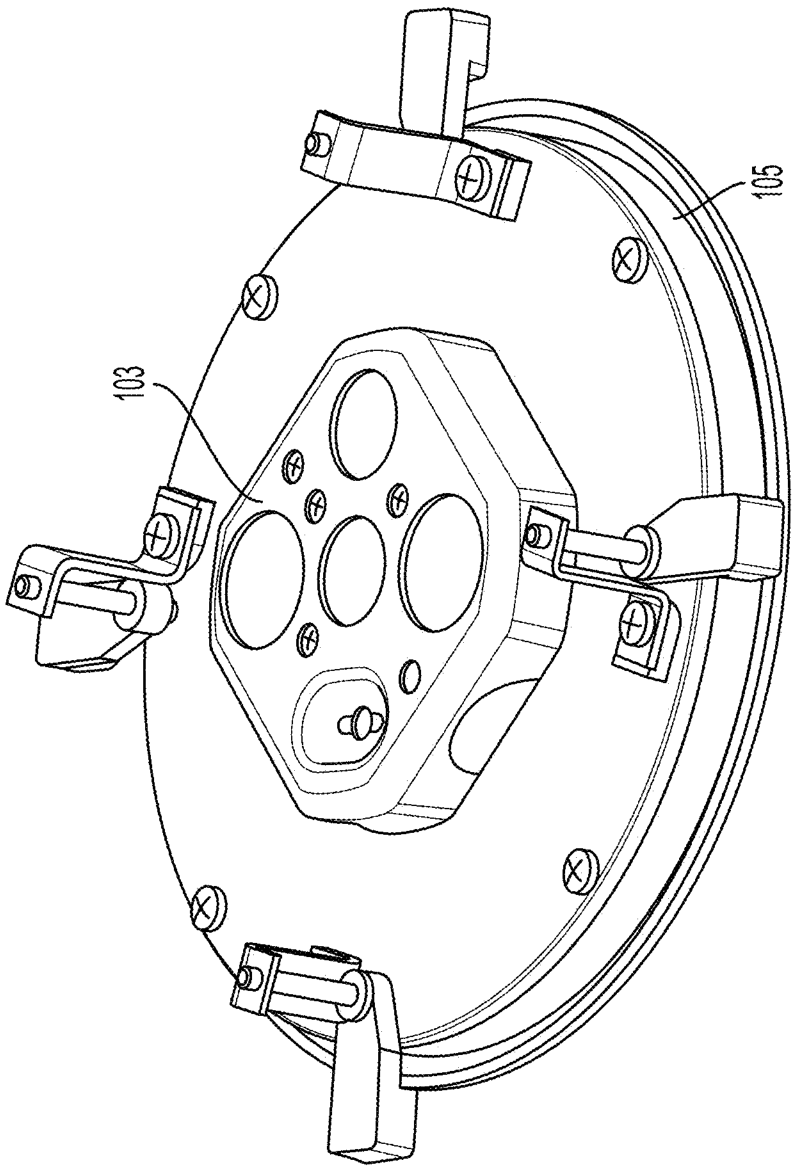
FIG. 5 shows a top-perspective view of a combination junction box and speaker of another embodiment of the system of the present invention.

FIG. 5 also shows the same embodiment as FIG. 4 but rotated further to show the top of the assembly. In this instance, the junction box 103 is positioned within the toroid formed by the canopy 105. A gasket (not shown) may be positioned between junction box 103 and the canopy 105 in order to form a seal therebetween.

Figure 6:
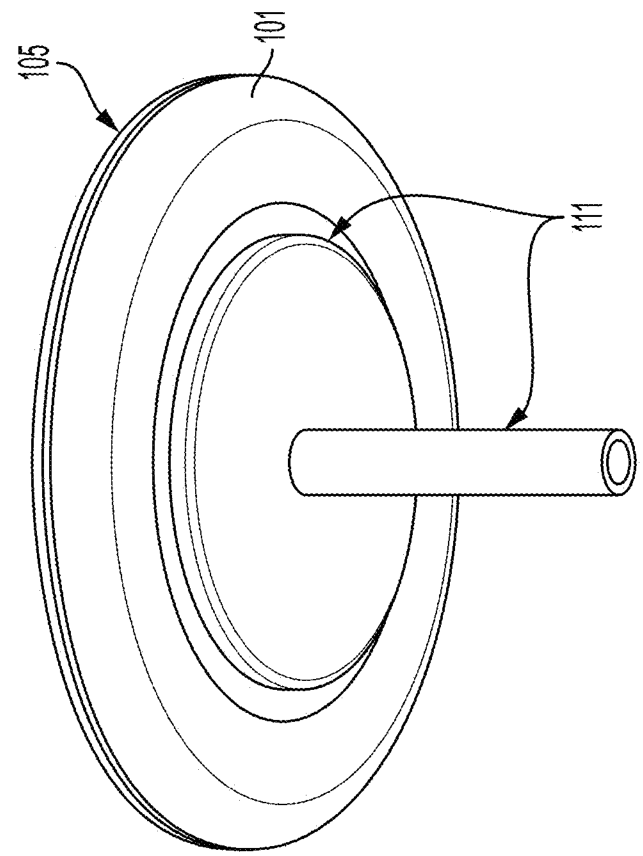
FIG. 6 shows a side-perspective view of a combination junction box and speaker of another embodiment of the system of the present invention, with an attached electrical fixture.
Figure 7:
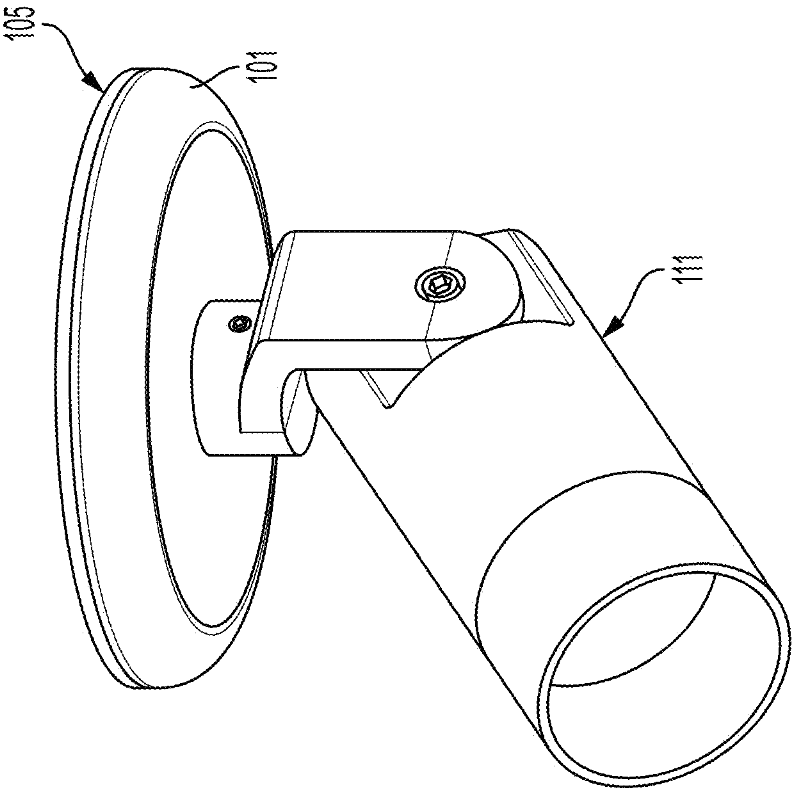
FIG. 7 shows a side-perspective view of a combination junction box and speaker of another embodiment of the system of the present invention, with an attached light fixture.
Figure 8:
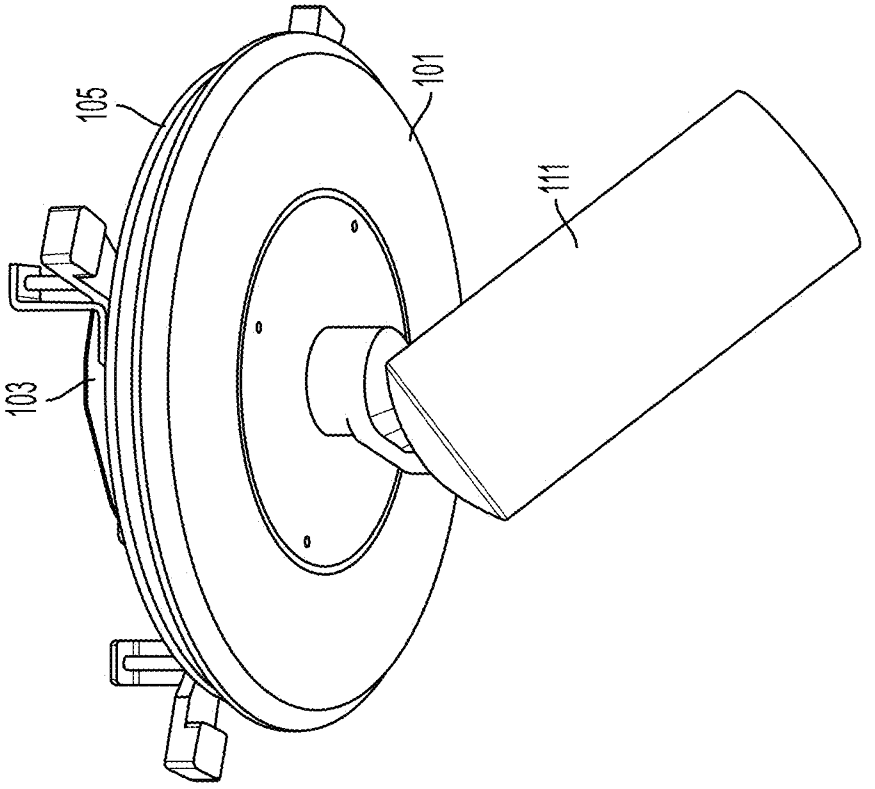
FIG. 8 shows a front-perspective view of a combination junction box and speaker of another embodiment of the system of the present invention, with an attached light fixture.

FIG. 6 shows another embodiment of the present invention in a finished condition in which an electrical junction box is conjoined with a canopy 105 that is configured with one or more speakers 101. In this instance, a fixture, such as a ceiling fan 111, has been affixed to the mounting elements 107. FIGS. 7 and 8 show a similar embodiment of the present invention in which a monopoint LED fixture has been affixed to the mounting elements 107. Note that the attached fixture may be replaced or updated without interfering with the functionality of the speakers.

Figure 9:
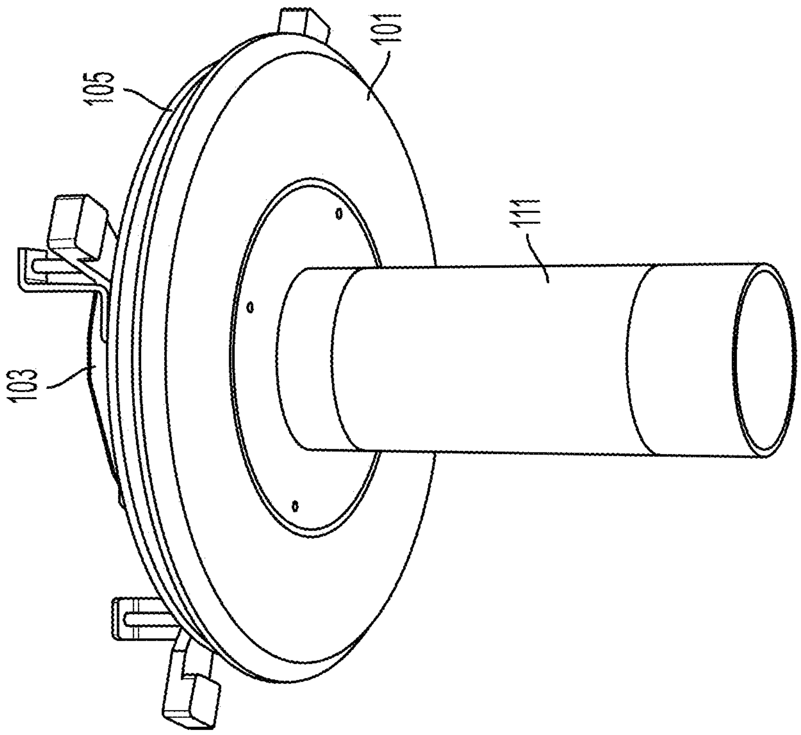
FIG. 9 shows a side-perspective view of combination junction box and speaker of another embodiment of the system of the present invention, with an attached light fixture.
Figure 10:
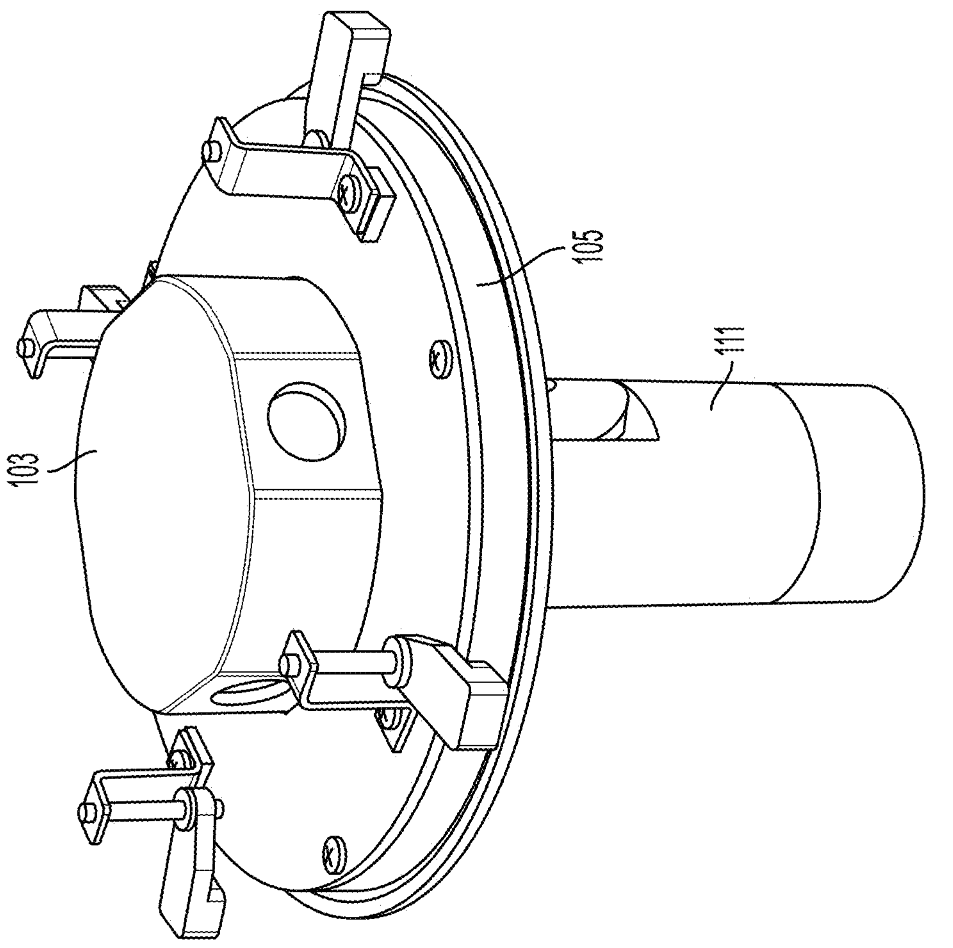
FIG. 10 shows a top-perspective view of combination junction box and speaker of another embodiment of the system of the present invention, with an attached light fixture.

FIG. 9 shows another embodiment of the present invention in which an electrical junction box is conjoined with a canopy 105 that is configured with one or more speakers 101. In this instance, a fixture, such as an LED downlight, has been affixed to the mounting elements 107. FIG. 10 shows the same embodiment as FIG. 9, however the view is rotated to show the junction box 103 conjoined to the canopy 105 with screws.

Figure 11:
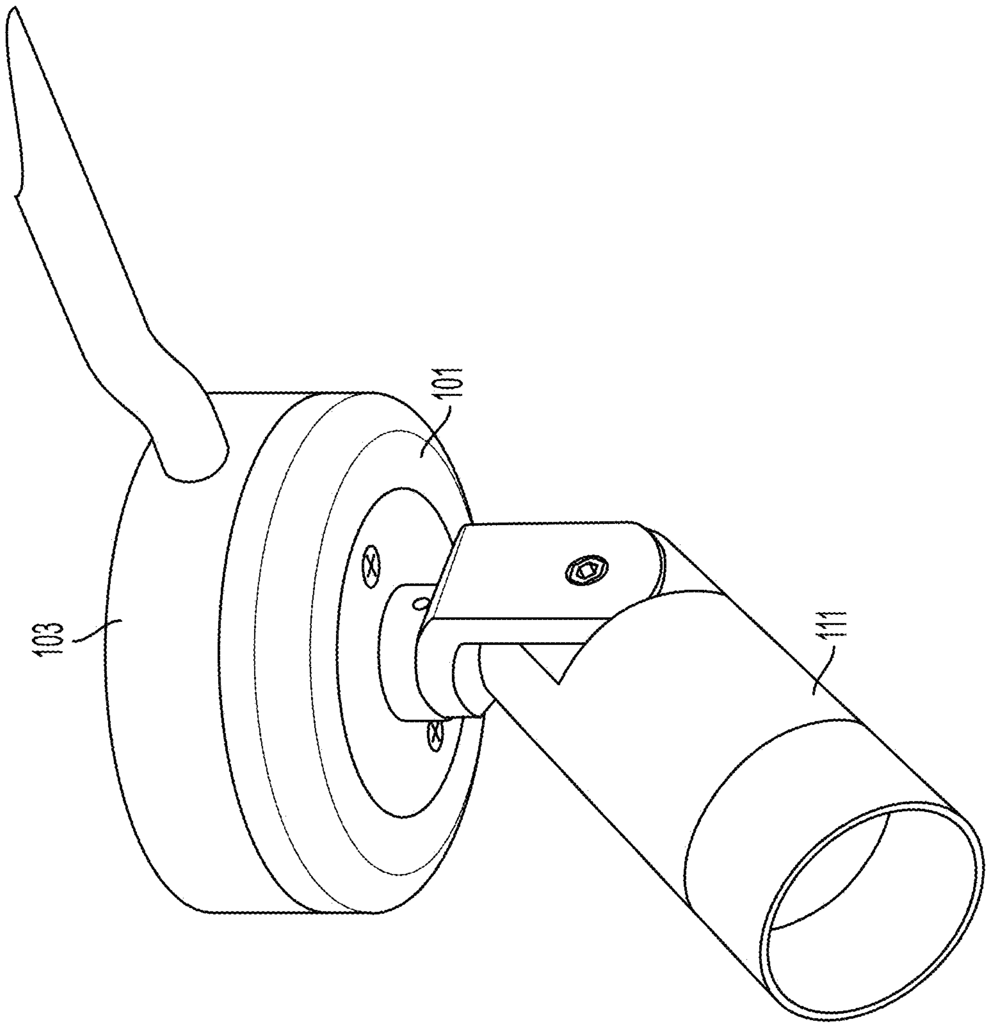
FIG. 11 shows a side-perspective view of combination wired junction box and speaker of another embodiment of the system of the present invention, with an attached light fixture.

FIG. 11 shows an embodiment similar to FIGS. 7 and 8 but the junction box 103 is mounted flush to the ceiling or wall and electrical and other wiring, for example speaker wiring, to the junction box is provided through cable housing on the side of the ceiling or wall that is visible to the occupant of the room.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for configuring desk lamps known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

I claim:

1. A system comprising:

a canopy that is coupleable to an electrical junction box, the electrical junction box being mountable in a structural surface and including a cavity defined by a plurality of sides and an opening, wherein the canopy is configured to surround the opening of the electrical junction box when coupled thereto, wherein the electrical junction box is operable to couple to an electrical device received via the opening, and wherein electrical conductors for the electrical device are coupleable within the cavity to electrical supply conductors; and one or more speakers disposed on a surface of the canopy, wherein when the canopy is coupled to the electrical junction box, the one or more speakers are disposed outside the cavity and do not intrude into the cavity.

2. The system of claim 1, wherein the electrical device is a light fixture.

3. The system of claim 1, wherein the structural surface is a wall.

4. The system of claim 1, wherein the electrical device is an electrical outlet.

5. The system of claim 1, wherein the structural surface is a ceiling.

6. The system of claim 5, wherein the electrical device is a fan.

7. The system of claim 1, further comprising a gasket that, when the canopy is coupled to the electrical junction box, is disposed between the canopy and the electrical junction box.

8. The system of claim 7, wherein the gasket is overmolded onto the electrical junction box.

9. The system of claim 7, wherein the gasket is overmolded onto the canopy.

10. The system of claim 1, wherein the canopy is coupleable to the electrical junction box via one or more screws.

11. The system of claim 1, further comprising an amplifier communicatively coupled to the one or more speakers.

12. The system of claim 1, further comprising a vibration-damping element configured to damp vibrations transmitted to the electrical device.

13. The system of claim 1, wherein the one or more speakers and the electrical device are configured to operate on low voltage power, line voltage power, or a combination thereof.

14. The system of claim 1, further comprising a microphone configured to receive voice commands.

15. The system of claim 1, further comprising mounting elements configured to couple the electrical device to the electrical junction box, wherein the mounting elements are sized for standardized electrical devices.

16. The system of claim 1, wherein the one or more speakers are configured to communicate via wireless signals in accordance with a wireless standard.

17. The system of claim 1, wherein the electrical device is removable and replaceable without interfering with functionality of the one or more speakers.

18. The system of claim 1, wherein the one or more speakers and the electrical device are configured to be independently controlled.

19. The system of claim 1, further comprising a volume control element.

20. The system of claim 1, wherein the electrical junction box is a standard, commercially available, off-the-shelf electrical junction box.

* * * * *